United States Patent [19]
Heckel, Jr.

[11] Patent Number: 6,003,394
[45] Date of Patent: Dec. 21, 1999

[54] ACTUATOR THAT ADJUSTS TO SIDE LOADS AUTOMATICALLY BY PIVOTING INTERNALLY

[75] Inventor: Donald T. Heckel, Jr., Simi Valley, Calif.

[73] Assignee: P.L. Porter Co., Woodland Hills, Calif.

[21] Appl. No.: 09/117,576

[22] PCT Filed: Jan. 29, 1997

[86] PCT No.: PCT/US97/01260

§ 371 Date: Jul. 31, 1998

§ 102(e) Date: Jul. 31, 1998

[87] PCT Pub. No.: WO97/28388

PCT Pub. Date: Aug. 7, 1997

Related U.S. Application Data

[63] Continuation-in-part of application No. 08/595,300, Feb. 1, 1996, Pat. No. 5,689,995.

[51] Int. Cl.[6] .................................................. F16H 25/24
[52] U.S. Cl. ..................................... 74/89.15; 74/424.8 R; 74/459; 188/67; 297/362.14
[58] Field of Search ............................ 74/89.15, 424.8 R, 74/459; 188/67; 297/362.14

[56] References Cited

U.S. PATENT DOCUMENTS

| | | |
|---|---|---|
| Re. 34,142 | 12/1992 | Fimeri . |
| 2,579,305 | 12/1951 | Cushman . |
| 3,583,762 | 6/1971 | Stries . |
| 4,040,663 | 8/1977 | Christensen . |
| 4,291,914 | 9/1981 | Mizelle . |
| 4,482,211 | 11/1984 | Fisher . |
| 4,782,715 | 11/1988 | Chevance . |
| 4,799,734 | 1/1989 | Periou . |
| 4,805,866 | 2/1989 | Aihara et al. . |
| 4,807,856 | 2/1989 | Teckenbrock . |
| 4,881,775 | 11/1989 | Rees . |
| 4,900,059 | 2/1990 | Kinoshita et al. . |
| 5,150,872 | 9/1992 | Isomura . |
| 5,209,637 | 5/1993 | Reubeuze . |
| 5,259,257 | 11/1993 | Mouri . |
| 5,277,672 | 1/1994 | Droulon et al. . |
| 5,320,413 | 6/1994 | Griswold et al. . |
| 5,689,995 | 11/1997 | Heckel, Jr. .............................. 74/89.15 |

FOREIGN PATENT DOCUMENTS

986283   3/1965   United Kingdom .

*Primary Examiner*—Allan D. Herrmann
*Attorney, Agent, or Firm*—Oppenheimer Wolff & Donnelly LLP

[57] ABSTRACT

The actuator includes a housing (12) and a gear nut (64) within the housing (12). A leadscrew (78) on which the gear nut (64) is threaded traverses the housing (12). As the leadscrew (78) moves axially, the gear nut (64) rotates. To prevent misalignment between the gear nut (64) and leadscrew (78), the gear nut's outer walls (74 and 76) and bearing surfaces (30 and 46) within the housing (12) permit the gear nut's axis of rotation to pivot in any direction along with any pivoting of the leadscrew (78), while allowing the gear nut (64) to rotate about the leadscrew (78). Therefore, if the leadscrew (78) is not aligned with the housing (12), the leadscrew will pivot the gear nut (64) so that the gear nut (64) remains aligned with the leadscrew (78) and movement of the leadscrew (78) can continue.

26 Claims, 8 Drawing Sheets

ACTUATOR THAT ADJUSTS TO SIDE LOADS AUTOMATICALLY BY PIVOTING INTERNALLY

CROSS-REFERENCE TO RELATED APPLICATION

This application is a continuation-in-part of application Ser. No. 08/595,300, filed Feb. 1, 1996 now U.S. Pat. No. 5,689,995.

BACKGROUND OF THE INVENTION

1. Field of the Invention

The present invention relates to seat actuators, primarily those used for vehicle seat recliners and possibly seat positioners.

2. State of the Art

As safety concerns for automobile and truck passengers increase, vehicle seats have become more complex. Linear actuators for allowing vehicle seats to move and the seat back to pivot are becoming increasingly complicated. One proposed linear actuator uses a leadscrew or threaded shaft. As it moves forward or backward axially due to the seat being reclined, a threaded gear nut or spin nut rotates about the leadscrew. The spin nut has a clutch that disengages the leadscrew when the user manually activates a recline lever. When the user releases the recline lever the clutch engages the shaft and prevents rotation of the spinning nut. That locks the leadscrew from further axial movement. Griswold, U.S. Pat. No. 5,320,413 (1994), Rees U.S. Pat. No. 4,881,775 (1989), and Périou U.S. Pat. No. 4,799,734 (1989), are examples of patents teaching this or similar types of seat actuators.

If a linear actuator is out of alignment, it can malfunction. That is, if the leadscrew is out of alignment (i.e., aligned up, down, to the side or at any angle to the gear nut), the gear nut does not spin freely around the leadscrew. Consequently, the leadscrew does not move freely backward and forward.

It has been proposed to use a gimbal mount for the entire mechanism as a way to overcome misalignment. The gimbal is expensive to manufacture and may require additional threaded fasteners that also are costly to make. Additionally, because of the added parts and the complexity of the gimbal mount, installation costs are high.

SUMMARY OF THE INVENTION

The principal object of the present invention is to disclose and provide a high-load linear actuator that compensates for installation and other misalignments.

The actuator includes a leadscrew that traverses the actuator housing. A gear nut within the housing surrounds and is threaded onto the leadscrew. As the leadscrew moves axially through the housing, the gear nut rotates. A ball, which is manually controlled by the user of the seat, moves in a slot radially to the gear nut. The ball can engage or disengage castellations on the gear nut. When the ball partially projects from the slot, the ball engages a gear nut castellation. The nut does not turn because the slot prevents the ball from rotating with the gear nut. Therefore, the leadscrew cannot move axially and the actuator is locked.

To prevent misalignment between the gear nut and leadscrew, the gear nut can pivot up, down, to the side or at an angle within the housing. Therefore, if the leadscrew is not aligned with the housing, the leadscrew pivots the gear nut so that the gear nut remains aligned with the leadscrew.

To accomplish pivoting, the gear nut has spherical ends or inserts with spherical end surfaces, and the housing has inner walls that are spherical. The inserts or spherical radii of the gear nut itself, against the inner walls, therefore, allow gear nut rotation, and they can slide relative to each other so that the gear nut can follow the leadscrew's orientation. The spherical radii, in contact with each other also allow the gear nut to spin.

In accordance with another preferred embodiment, the gear nut includes ends or inserts which have a spherical surface. The gear nut is mounted for rotation on a conical support surface. This arrangement results in a relatively small gear nut/support surface contact area.

The actuator has a two-piece housing. The housing sections can be tightened relative to each other to squeeze against the spherical gear nut or its inserts. This minimizes "chuck," which is undesired movement of the leadscrew while the unit is locked. Alternatively, a housing may be provided with a threaded opening and cap arrangement that performs substantially the same function.

These and other objects of the invention may be seen more clearly from the detailed description of the preferred embodiment that follows.

DETAILED DESCRIPTION OF THE PREFERRED EMBODIMENTS

Figures 1, 2:
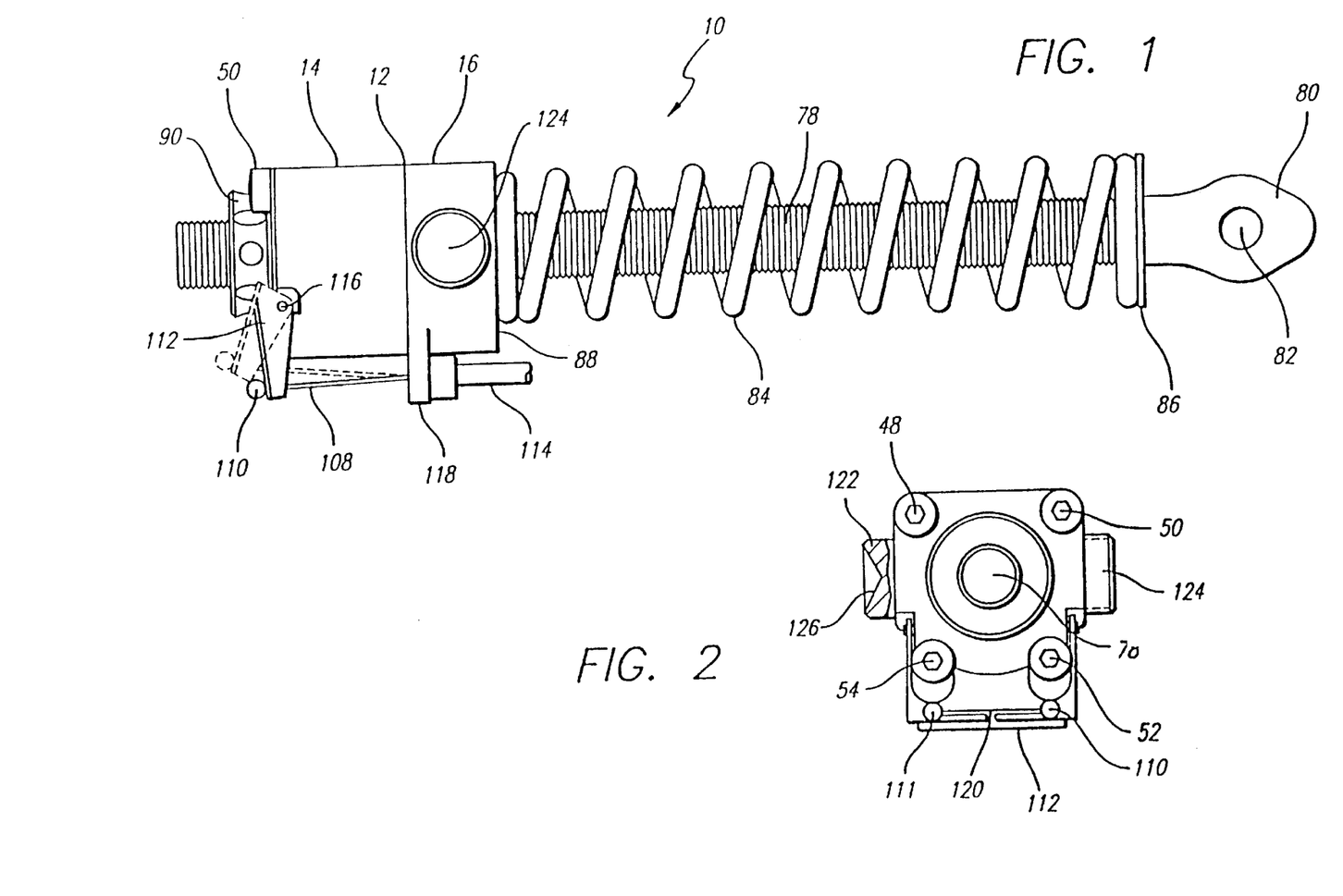
FIG. 1 is a side view of a linear actuator in accordance with one embodiment of the present invention.
FIG. 2 is an end view of the linear actuator shown in FIG. 1 as seen from the left side of FIG. 1 with the stop ring removed to reveal certain aspects of the actuator.
Figure 3:
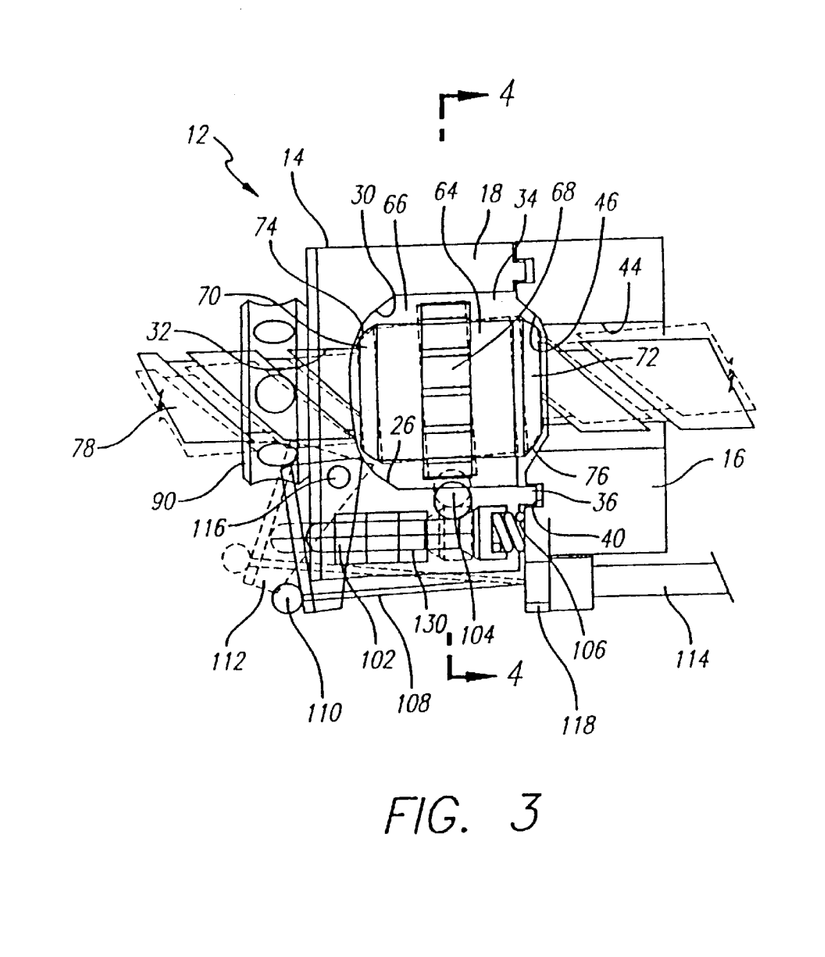
FIG. 3 is a side, sectional view of a portion of the linear actuator shown in FIG. 1.

The linear actuator 10 of the present invention includes a housing 12 (FIGS. 1 and 3). In the exemplary embodiment, the housing is formed of plastic, but it may also be formed of die cast metal or of some metal and some plastic sections.

Housing 12 has two major sections, a plastic main section 14 and a metal mounting block 16 (FIGS. 1 and 3). Upstanding wall 18 and end wall 26 form main section 14. The end wall's inner surface 30 is spherical. Upstanding wall 18 forms a cylinder at the open end 34 of the main housing (FIGS. 3 and 4), which curves into the spherical end 30 (FIG. 3). End wall 26 also has a tapered hole 32 extending through it (FIG. 3).

As FIG. 3 shows, upstanding wall 18 has a circumferential projection 36. When mounting block 16 is mounted over the open end 34 of main housing 12, projection 36 projects into a corresponding circumferential groove or trepan 40 on the mounting block (FIG. 3). An arrangement other than circumferential projections and grooves can be used to mount the housing and the mounting block together. For example, short pegs may fit into indentations. Small springs (not shown) could mount in a groove or indentation to bias the housing and mounting block apart.

The mounting block also has a spherical inner surface 46 (FIG. 3) and a central tapered hole or bore 44. Surfaces 30 and 46 are approximately the same or are part of the same sphere. That is, the surfaces in theory have a common center and nearly, if not, equal radii.

Four bolts 48, 50, 52 and 54 (FIG. 2) extend through bores 56, 58, 60 and 62 (FIG. 4) in the mounting block. The bolts thread into threaded bores (not shown) in the end of the mounting block. Rivets, self-tapping screws and similar fasteners could replace the bolts and threaded bores. Also, the exemplary embodiment uses four bolts, but more or fewer could be used.

Gear nut 64 (FIGS. 3 and 4) fits within space 66 inside the open end 34 of main housing 14 and extends between the main housing's spherical wall 30 and the spherical wall 46 of mounting block 16. The gear nut is generally cylindrical (FIG. 3) with a larger diameter central ring 68. Optional nylon or other low friction annular inserts 70 and 72 attach to the end of the gear nut. The inserts are open in their centers and have spherical end surfaces 74 and 76 (FIG. 3). These spherical surfaces conform to spherical walls 30 and 46 of the main housing and mounting block in that all surfaces have nearly the same center and radius. Accordingly, the gear nut can pivot with the longitudinal axis of the leadscrew in any direction within space 66. All spherical walls 30, 46, 70 and 72 should be smooth to reduce friction.

Using plastic or partially plastic inserts or bearings decreases the cost of the gear nut. Alternatively, the gear nut could be a powdered metal part, metal injection molding or machined to have spherical ends.

A shaft or leadscrew transverses the housing. In the exemplary embodiment (FIGS. 1 and 3), leadscrew 78 has an ACME thread. One choice for the leadscrew is ⅝ in (16 mm [metric conversions are rounded and approximate]) diameter with a 4 threads per inch pitch and four starts. Only FIG. 3 shows the threads of the leadscrew, and they are not drawn to scale. The design of the seat that incorporates the actuator of the present invention determines the leadscrew's length. One end of the leadscrew is flattened to form a tang 80 (FIG. 1). A center opening 82 in the tang allows that end of the actuator to be attached to part of the seat assembly.

As FIG. 1 shows, a return spring 84, which surrounds the leadscrew, extends between washer 86 and wall 88 of mounting block 16. Other arrangements that do not use the washer may be used. The spring is in compression to bias the leadscrew to the right in FIG. 1. Stop ring 90 is crimped on the left end (FIGS. 1 and 3) of the leadscrew to prevent the leadscrew from being withdrawn from the housing. One can employ alternate methods, such as a formed end on the leadscrew after it is installed, to accomplish the same goal without the stop ring.

Gear nut 64 is open at 92 at its center. See FIG. 4. The gear nut also has internal threads that correspond with the leadscrew's threads. Also, inserts 74 and 76 have openings that are aligned with the gear nut's opening so that the leadscrew passes freely through the inserts.

Figure 4:
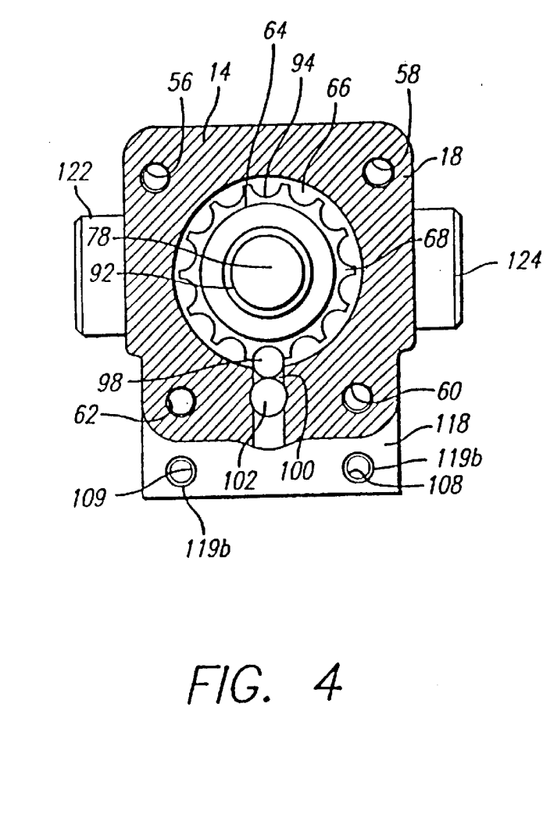
FIG. 4 is a sectional view through plane 4—4 of FIG. 3.

As the leadscrew moves axially (because of a force on tang 80), the gear nut rotates within space 66 (FIG. 3). The gear nut's ring 68 has circumferentially spaced castellations 94 (FIG. 4), sixteen in the exemplary embodiment. A ball 98 in housing groove 100 can move into a castellation. When that occurs, the gear nut cannot rotate. FIG. 4 shows the ball in the locked position. A piston 102 (FIGS. 3 and 4) which is mounted in the housing, has a section with a larger diameter 104 that can be positioned below ball 98. FIG. 4 shows that part of the piston passes through part of groove 100.

Spring 106 biases the piston to the left (FIG. 3). A wire 108 attaches to bracket 112 on the left end of housing 12 (FIGS. 1 and 3). The bracket pivots on pin or projection 116 on the housing and rests against piston 102. The bracket has a slot 120 (FIG. 2) that receives wire 108. A stop 110 on the end of the wire secures the wire to the bracket. When one manipulates an actuator such as a handle or button (not shown), the actuator pulls the wire 108 to the right (FIGS. 1 and 3). As a result, bracket 112 pushes piston 102 to the right (FIG. 3) and causes a narrower diameter section 130 of the piston to move under ball 98. Consequently, the ball moves out of its castellation and gear nut 64 freely rotates. Therefore, leadscrew 78 can move axially. Upon release of the handle, spring bias pushes piston 102 to the left (FIG. 3) and returns bracket to its left-most position. When the piston moves to the left, its raised portion 104 pushes ball 98 into a castellation. As FIG. 4 shows, ball 98 remains partially within groove 100. Therefore, the ball cannot rotate with the gear. Therefore, when the ball is in a castellation; the ball/groove connection prevents gear nut rotation. This locks the leadscrew.

One could substitute a pivoting or rocking member with a appropriate end in place of ball 98. Also, slots or grooves could substitute for the rounded castellations 94. One could also use various clutch mechanisms to secure and release the leadscrew. Applicant refers to application Ser. No. 08/541, 148, filed Oct. 11 1995, by C. R. Stringer, and assigned to P. L. Porter Co., the assignee of the present application, for additional discussions about alternative spinning nut structures. That application is incorporated by reference.

The wire 108 leads to cable 114, which is attached to bracket 118 (having apertures 119a and 119b) on part of the bottom of the mounting block 16 (FIGS. 1, 3 and 4). The other end of the wire attaches remotely to an actuator accessible to the user of the seat. Bracket 118 could house a second cable with a second wire 109 to a second actuator. See FIG. 2 which shows 2 stops 110 and 111 on the end of the wires. For example, one handle could be within reach of the person sitting in the seat, and the second handle could be within reach of a rear seat passenger or person entering a car who needs to pivot the seat back to enter the rear seat area.

A pair of bosses 122 and 124 are a part of and project from the sides of mounting block 16 (FIGS. 1, 2 and 4). For strength, the bosses preferably are metal. Each may have a 120° conical indentation 126 (FIG. 2). Mounting hardware on the vehicle seat (not shown) accepts and restrains the bosses so that the bosses can pivot while constrained by the hardware. This allows the actuator to pivot about an axis through the bosses.

If the leadscrew 78 is not properly aligned with gear nut 64, the leadscrew would tend to bind as it moved through the gear nut. See FIG. 3, which shows the leadscrew in orientations relative to the housing. In the present invention, any leadscrew misalignment pivots the gear nut with the leadscrew (See FIG. 3) as the spherical surfaces 74 and 76 of inserts 70 and 72 slide along and spin against the spherical inner walls 30 and 46. Therefore, the leadscrew and gear nut remain aligned and do not bind.

The spherical surfaces 74 and 76 of inserts 70 and 72 must apply proper force to spherical inner walls 30 and 46. This is accomplished by tightening bolts 48, 50, 52 and 54 or other comparable fasteners properly. Proper tightening minimizes "chuck," the undesired movement of the leadscrew or gear nut relative to the rest of the locked assembly.

Other exemplary embodiments of the present invention are illustrated in FIGS. 5–14. In the exemplary embodiment shown in FIGS. 5–8, which is generally represented by reference numeral 132, a gear nut 134 is located within a housing 136 that includes a main section 138 and a threaded end cap 140. The end cap threads 143 mate with corresponding threads on the inner surface of the main section (threads not shown). The gear nut 134 has internal threads which engage a leadscrew 135 (see FIG. 8—threads not shown) in the manner described above. The interior of the housing 136 includes a pair of bearing assemblies 142 and 144 which support the gear nut 134.

Figure 7:
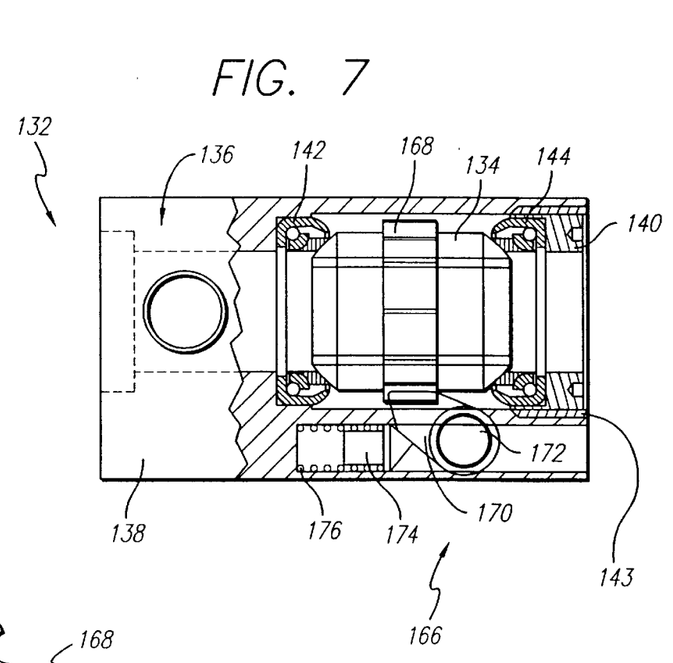
FIG. 7 is a side, partial sectional view of the linear actuator shown in FIG. 5.
Figures 8, 8A:
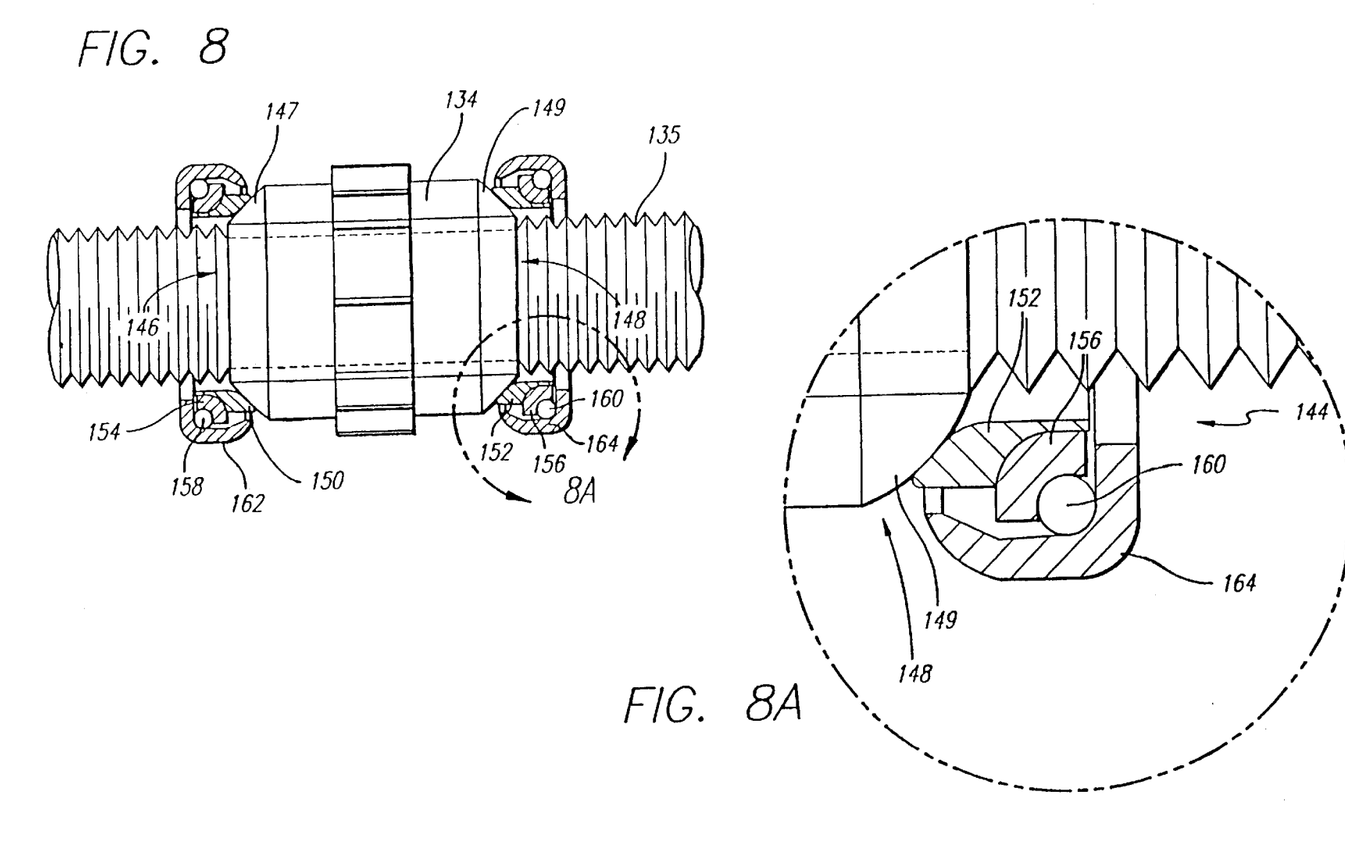
FIG. 8 is a side, partial sectional view of the gear nut and bearing assemblies shown in FIG. 5.

Referring more specifically to FIG. 8, the longitudinal end surfaces 146 and 148 of the gear nut 134 have a curved shape, as do the respective interior surfaces of the bearing assemblies 142 and 144. As noted above, the curved end surfaces 146 and 148 of the gear nut 134 may be formed through molding, machining or by adding inserts 147 and 149 (as shown) with the appropriate curvature. In the embodiment illustrated in FIGS. 5–8, the interior surfaces of the bearing assemblies 142 and 144 are in the form of low friction inserts 150 and 152 that are press-fit into the bearing assemblies. The low friction inserts 150 and 152 rotate with the gear nut 134. The remaining portions of the bearing assemblies consist of respective inner races 154 and 156, groups of ball bearings 158 and 160, and outer races 162 and 164. Here too, the inserts may be eliminated, ;if desired, and replaced by suitably surfaced inner races. The curved end surfaces 146 and 148 of the gear nut 134 define respective spherical surfaces (be they formed by molding, machining or through the use of inserts). The surfaces of the inserts 150 and 152 have a conical tapered shape. If the leadscrew is not properly aligned, the spherical surface portions of the gear nut 134 will slide along the respective conical surfaces of the inserts 150 and 152, thereby maintaining gear nut/leadscrew alignment and preventing binding.

In the exemplary embodiment shown in FIGS. 1–4, the spherical surfaces of the gear nut 64 are in contact with housing spherical surfaces 34 and 46. By contrast, in the exemplary embodiment shown in FIGS. 5–8, the gear nut 134 includes spherical surfaces, while the surfaces of the inserts 160 and 152 have a conical tapered shape. The contact area between the gear nut 134 and the bearing assemblies 142 and 144 is, therefore, substantially less than the contact area between the gear nut 64 and the housing surfaces 34 and 46. The contact surface between the gear nut 134 and each of the bearing assemblies 142 and 144 is essentially a thin line which circles the gear nut curved end surfaces 146 and 148. This remains true as misalignment of the leadscrew causes the gear nut 134 to pivot with respect to the bearing assemblies 142 and 144. Thus, as the leadscrew moves in and out of alignment, the gear nut 134 will experience less frictional resistance to pivoting than will the gear nut 64.

With respect to assembly of the unit, the threaded end cap 140 allows the gear nut 134 and bearing assemblies 142 and 144 to be easily placed within the housing main section 138. Thereafter, the threaded end cap may be used to apply the proper force to the bearing assemblies so as to minimize "chuck." The end cap 140 may then be locked in place by any suitable method such as, for example, the use of adhesive or deforming small, adjacent portions of the cap 140 and the main body section 138. Such an arrangement is easier to assemble and easier to adjust for friction and chuck than one which relies on tightening bolts to join respective sections of a housing.

Figure 5:
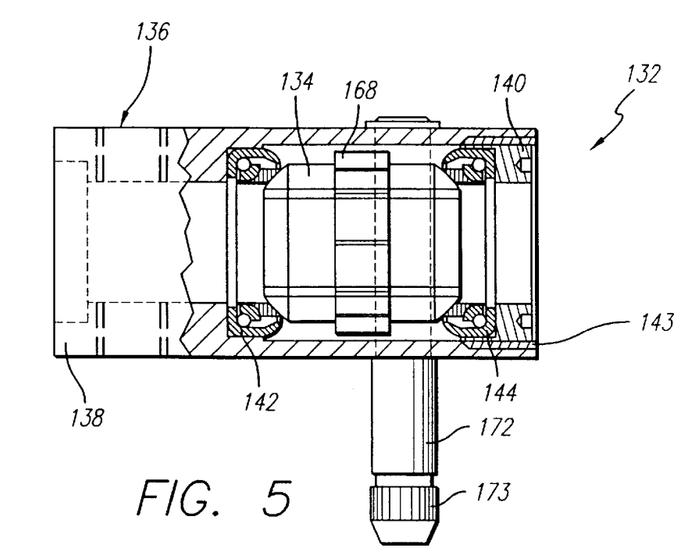
FIG. 5 is a top, partial sectional view of a linear actuator in accordance with another embodiment of the present invention.
Figure 6:
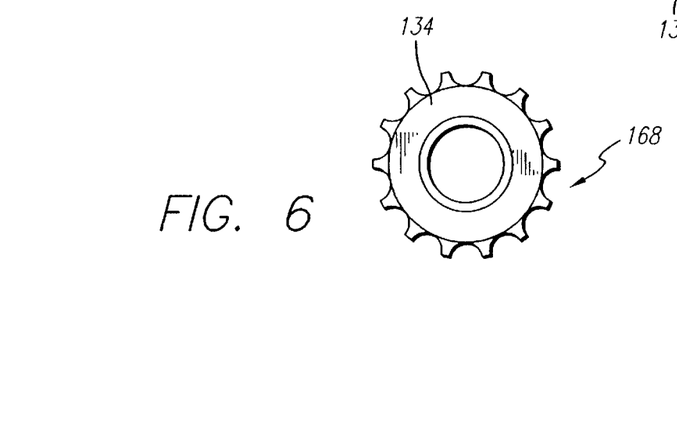
FIG. 6 is an end view of the gear nut shown in FIG. 5.

As shown by way of example in FIGS. 5–7, rotation of the gear nut 134 may be prevented with a locking assembly 166 that is adapted to engage one of the castellations 168 on the gear nut. The locking assembly 166 includes a locking lever 170 that rotates with a spindle 172 between an engaged (or locked) orientation and disengaged (or unlocked) orientation. The locking lever 170 and spindle 172 are preferably separate structural elements that are connected to one another by any suitable method such as, for example, keying or splining. The spindle 172 includes splines 173 that are used to attach the spindle to an operating lever or handle (not shown). This spindle and handle arrangement eliminates the need for the wires and cables discussed above. In the illustrated embodiment, one surface of the locking lever 170 engages the castellations 168, while another surface of the locking lever is engaged by a plunger 174 that has a suitable cam surface. The plunger 174 is biased in the direction of the locking lever 170 by a spring 176 or other resilient element. The plunger 174 and spring 176 maintain the locking lever 170 in the engaged orientation. Operation of the handle (and, therefore, rotation of the spindle 172) will overcome the force of the biasing spring 176 and cause the locking lever 170 to move out of engagement with the gear nut 134, thereby allowing the gear nut to rotate.

Figure 9:
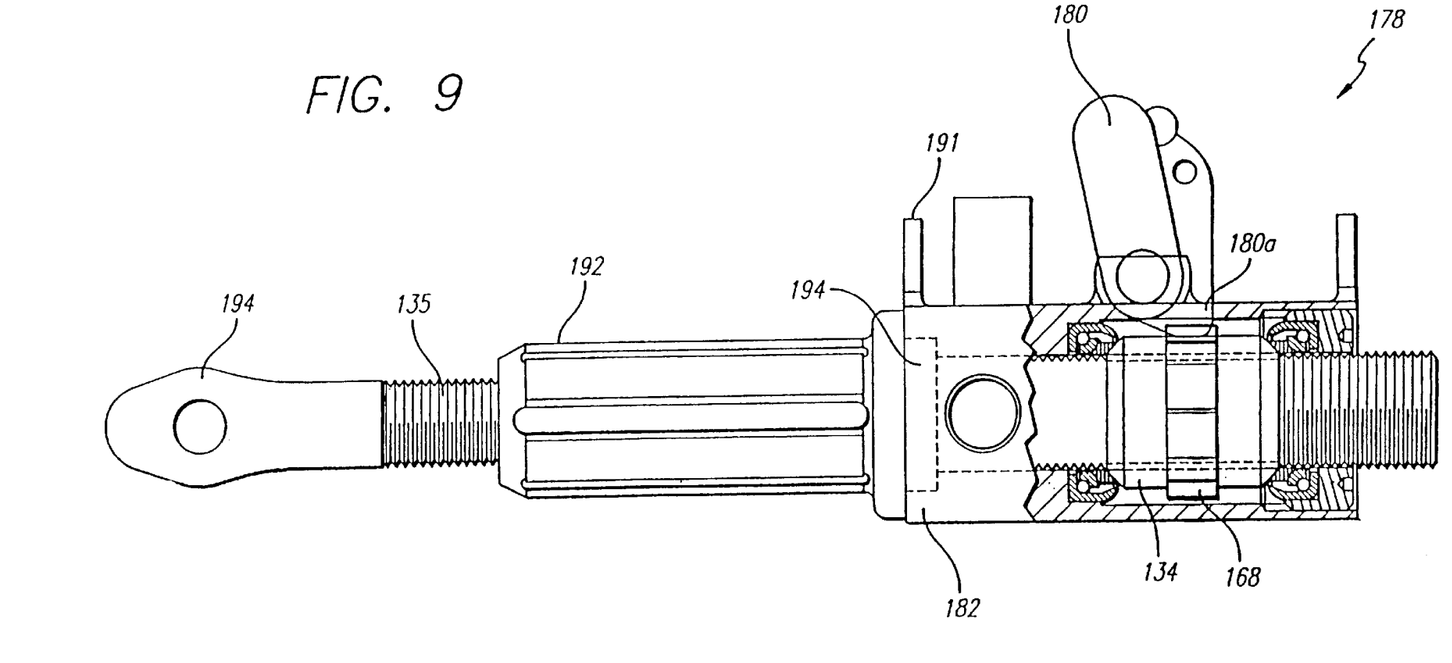
FIG. 9 is a side, partial sectional view of a linear actuator in accordance with another embodiment of the present invention.
Figure 10:
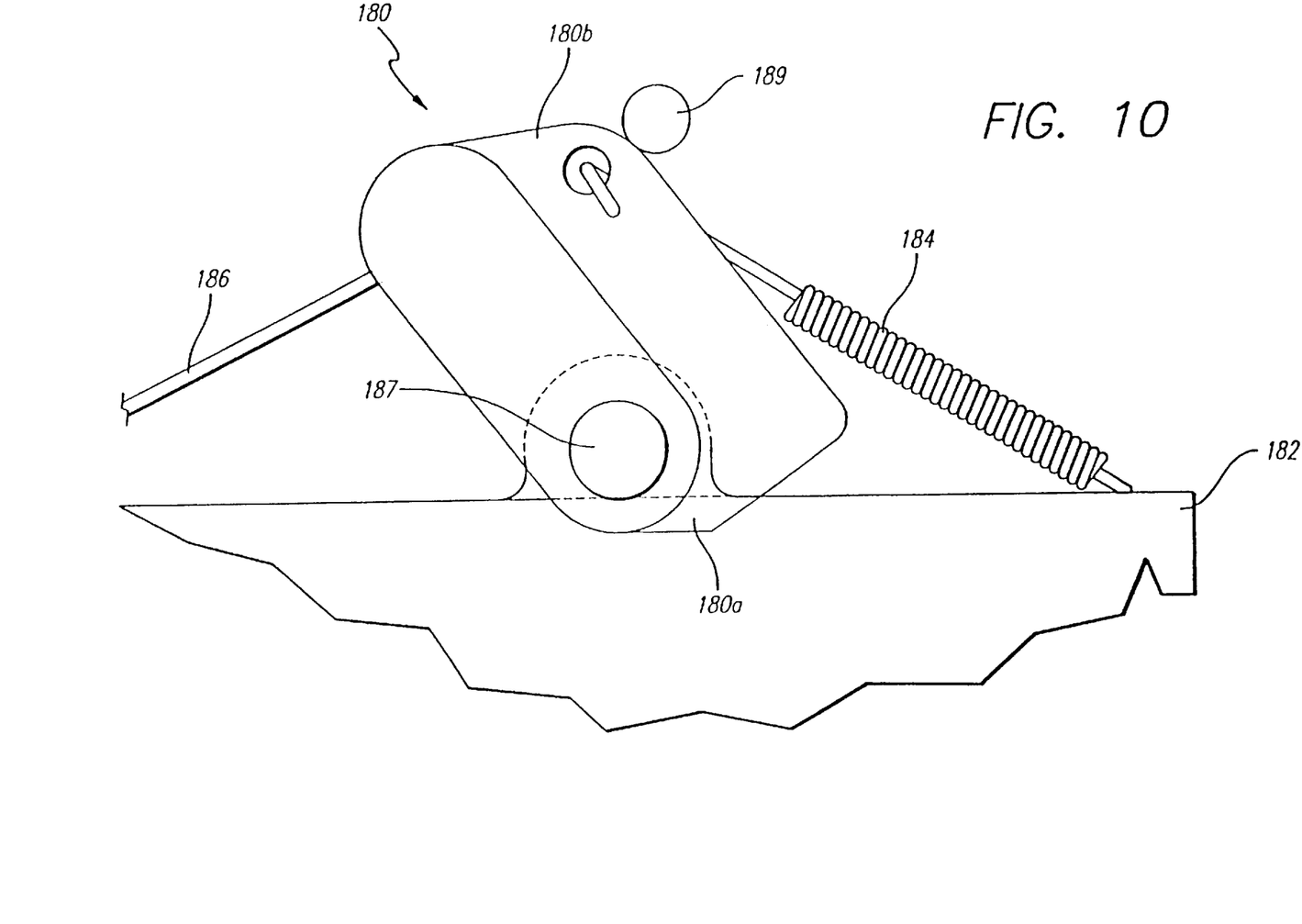
FIG. 10 is a partial side view of an exemplary locking assembly.
Figure 11:
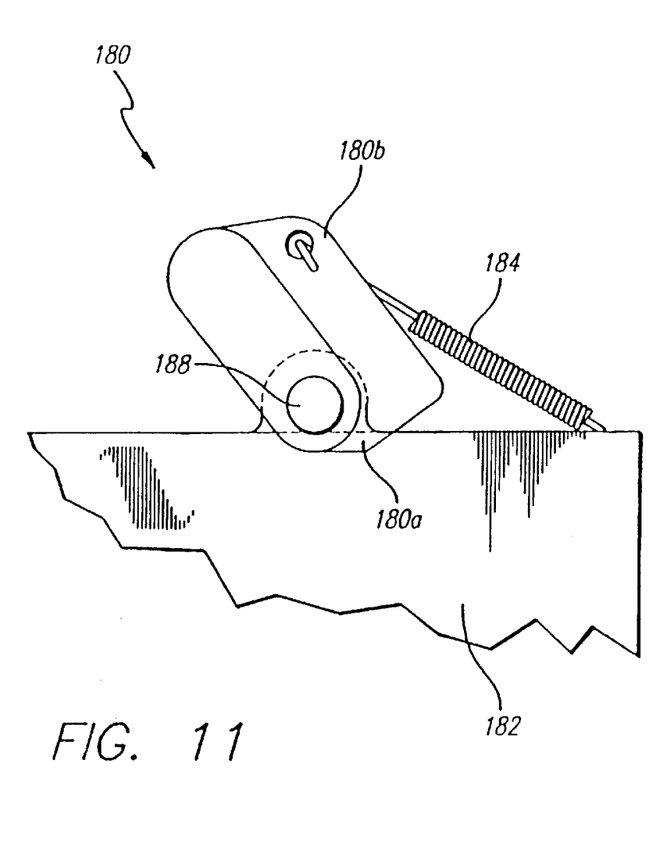
FIG. 11 is a partial side view of another exemplary locking assembly.
Figure 12:
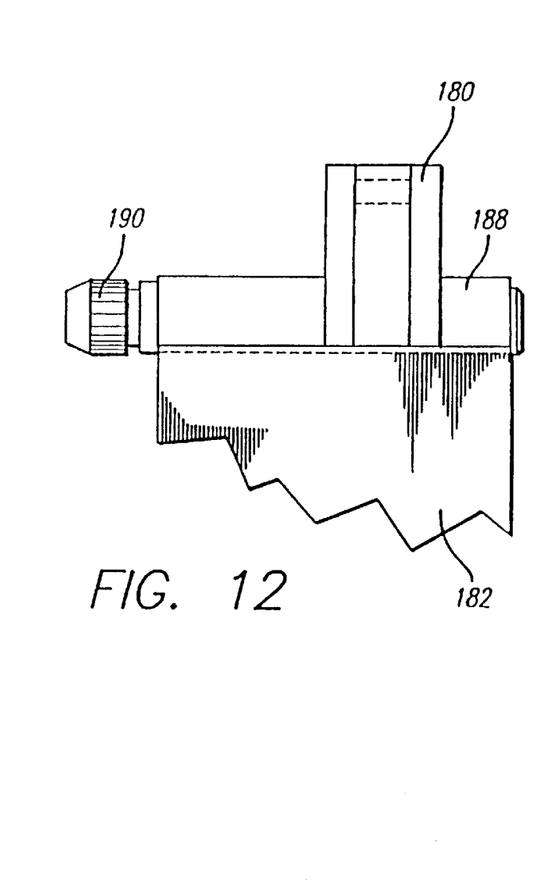
FIG. 12 is a side view of the spindle and lever shown in FIG. 11.

Another exemplary locking assembly 178 is shown in FIGS. 9–12. Here, a locking lever 180 is pivotably mounted on the exterior of a housing 182 such that one end 180a extends through an opening in the housing. As the locking lever 180 pivots, it moves between a locked position where end 180a engages the castellations 168 and an unlocked position where the end is disengaged. The locking lever 180 is biased to the locked position by a resilient element, such as a spring 184 (shown in FIGS. 10 and 11) that is attached to the housing 182 and to an end 180b of the lever. Referring more specifically to FIGS. 9 and 10, the lever may be pulled to the unlocked position by a cable (or cables) 186 when mounted for rotation on a rod 187. The cable 186 is secured to the locking lever 180 by a ball 189 and is guided by a guide 191. The ball 189 prevents the cable 186 from being pulled through the lever 180. Alternatively, as shown in FIGS. 11 and 12, the lever 180 may be attached to a spindle 188. The locking lever 180 will rotate with the spindle 188 when a handle (not shown) is operated. The handle may be connected to the spindle 188 through the use of splines 190, or any other. suitable fastening device. The locking lever 180 may be connected to the spindle 188 in the same or similar manner.

As shown by way of example in FIG. 9, the present invention may also include a leadscrew guide 192. The leadscrew guide 192 guides the leadscrew 135 and helps maintain the alignment thereof. The guide may also be used to mount a return spring and prevent the return spring from rubbing against the leadscrew. Additionally, the leadscrew guide 192 acts as a stop to prevent the leadscrew head 194 from moving past the end of the guide. The exemplary guide 192 includes an insert portion 194 which is inserted into an aperture in the housing 182 (or 136) during assembly.

Figure 13:
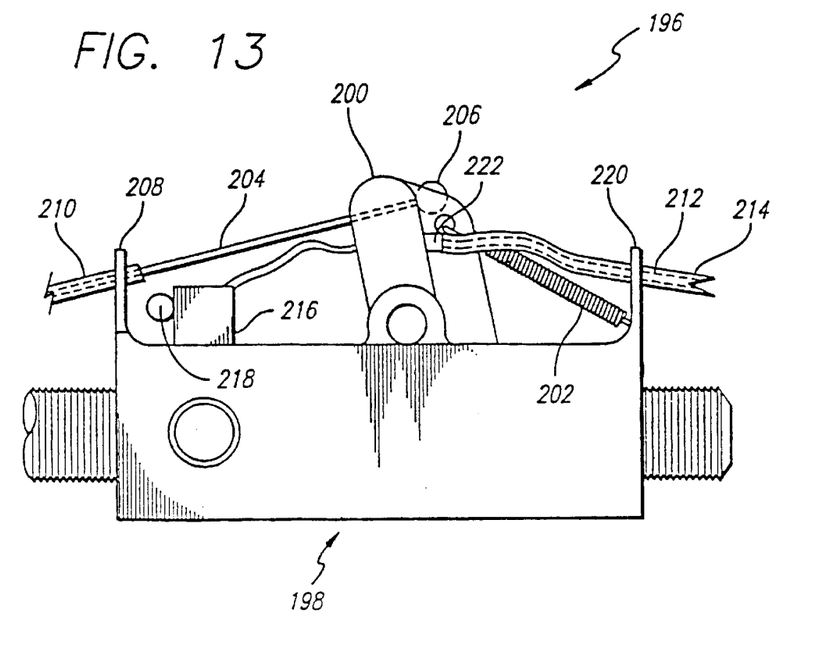
FIGS. 13 and 14 are side views of still another exemplary locking assembly.
Figure 14:
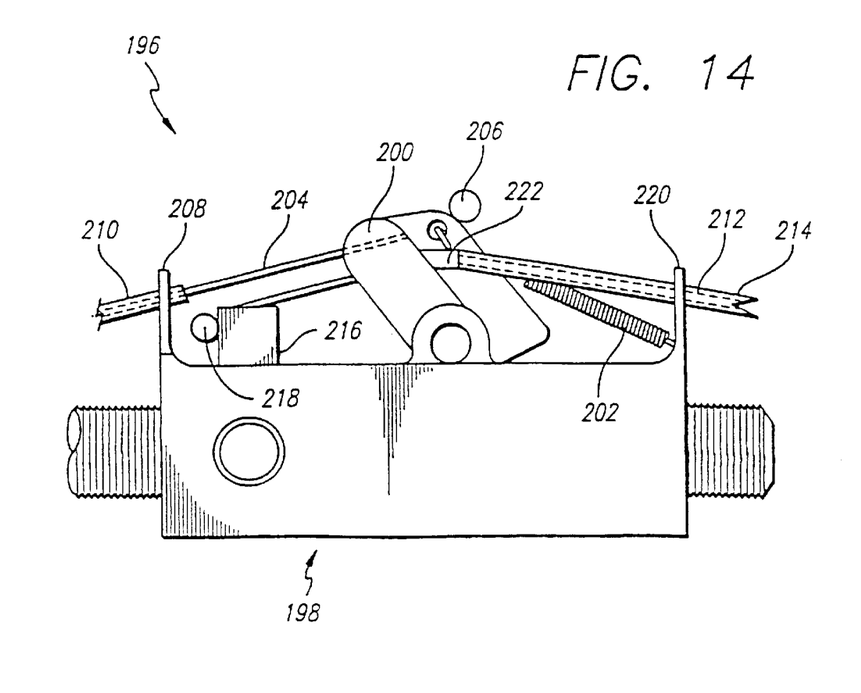

In accordance with another advantageous aspect of the invention, and as illustrated for example in FIGS. 13 and 14, a locking assembly 196 can be actuated by two cables which approach a linear actuator 198 (preferably one of the actuators described above) from different directions. More specifically, the locking assembly 196 includes a locking lever 200 (preferably of the type shown in FIG. 10) that is biased to the locked position shown in FIG. 13 by a spring 202. This prevents rotation of a gear nut (not shown) within the linear actuator 198. The locking lever 200 can be moved to the unlocked position shown in FIG. 14 by a first cable 204 which connects the locking lever to an actuator at a first location. In the exemplary embodiment, the cable 204 is secured to the locking lever 200 by a ball 206 and guided by a guide 208. The cable 204 is also covered by a protective covering, or conduit 210.

A second cable 212 and conduit 214 arrangement allows the locking lever 200 to be actuated from a second location. One end of the cable 212 is secured to an anchor 216 by a ball 218. From there, the cable 212 passes through an opening in the locking lever 200, through a guide 220, and then on to the second location. The guide 220 also holds the conduit 214 and prevents the conduit from moving relative to the actuator while allowing movement of the cable 212 within the conduit. A fitting 222 may, if desired, be placed between the end of the conduit 214 and the locking lever 200 in order to protect the end of the conduit from wear. Otherwise, the end of the conduit 214 will abut the locking lever 200.

As illustrated for example in FIG. 13, the cable 212 and conduit 214 are bent when the locking assembly 196 is in the locked orientation. In other words, there is slack in the cable 212 and conduit 214. The cable 212 is straightened on both sides of the locking lever (i.e. the slack is removed) when the cable is pulled due to actuation of a handle, lever or other suitable device at the second location. (See FIG. 14.) The straightening of the cable 212 causes the conduit 214 to straighten out. As the conduit 214 straightens, it overcomes the biasing force of spring 202 and pushes the locking lever 200 to the unlocked position shown in FIG. 14. The conduit 214 is preferably formed at least in part from a plastic material and the stiffness of the conduit must be such that it is flexible enough to bend with the cable 212 under the biasing force of the spring 202, yet stiff enough to straighten out with the cable when the cable is pulled.

There are a number of practical applications for a locking assembly that can be actuated by two cables which approach a linear actuator from different directions. For example, the front seats of automobiles are typically capable of both reclining for passenger comfort and folding forward to allow a passenger in the back seat to exit. Use of the locking assembly 196 would allow the seat's linear actuator, which locks the seat in place, to be unlocked from different locations. One seat release handle may be located next to the seat cushion of the front seat, while another handle may be located in close proximity to the back seat. As a result, a person sitting in the back seat will be able to release the front seat and exit the vehicle without having to reach forward and find the seat release handle next to the front seat's cushion (which is often blocked from view by the front seat itself).

The embodiments that have been described are manually activated. They could be electrically operated with some modifications. For example, instead of having castellations, the gear nut could be a helical gear that a mating gear or worm could drive. Locking the driving motor would lock the gear nut. Another modification concerns the mounting of ball 98. Instead of relying on gravity to remove the ball from a castellation, the ball could be spring mounted.

Other numerous modifications and alternate embodiments will occur to those skilled in the art. Therefore, applicant intends that the invention be limited only in terms of the appended claims.

I claim:

1. A linear actuator, comprising:
   a housing;
   a leadscrew traversing the housing;
   a gear nut, located substantially within the housing and around the leadscrew, rotating in response to axial movement of the leadscrew relative to the gear nut, and including first and second longitudinal end portions having curved surfaces which define a gear nut end surface curvature; and
   first and second bearing surfaces respectively engaging the first and second longitudinal end surfaces of the gear nut such that the gear nut is capable of pivoting to change the axis of rotation of the gear nut, the bearing surfaces defining a bearing surface curvature which is different than the gear nut end surface curvature.

2. A linear actuator as claimed in claim 1, wherein one of the gear nut end surface curvature and the bearing surface curvature is substantially spherical and the other of the gear nut end surface curvature and the bearing surface curvature is substantially conical.

3. A linear actuator as claimed in claim 2, wherein the gear nut end surface curvature is substantially spherical.

4. A linear actuator as claimed in claim 1, wherein the first and second bearing surfaces are associated with first and second bearing assemblies.

5. A linear actuator as claimed in claim 4, wherein the first and second bearing assemblies include respective fixed portions and respective rotating portions.

6. A linear actuator as claimed in claim 5, wherein the first and second bearing surfaces comprise first and second inserts which are respectively secured to the rotating portions of the first and second bearing assemblies.

7. A linear actuator as claimed in claim 1, wherein the first and second end portions of the gear nut and the first and second bearing surfaces define respective contact areas therebetween, each contact area being in the form of a thin line that circles a respective gear nut end portion.

8. A linear actuator as claimed in claim 1, wherein the housing comprises a main section defining a threaded opening and threaded end cap adapted to engage the opening and apply a variable force to at least one of the first bearing surface, the second bearing surface, and the gear nut.

9. A linear actuator, comprising:
   a housing;
   a leadscrew traversing the housing;
   a gear nut, located substantially within the housing and around the leadscrew, rotating in response to axial movement of the leadscrew relative to the gear nut, and including a plurality of circumferentially-spaced castellations and first and second longitudinal end portions defining a gear nut end surface curvature;
   first and second bearing surfaces respectively engaging the first and second longitudinal end surfaces of the gear nut such that the gear nut is capable of pivoting to change the axis of rotation of the gear nut, the bearing surfaces defining a bearing surface curvature; and
   a locking mechanism including a pivotable lever to move between a locked position wherein the lever engages one of the castellations and an unlocked position, and a biasing device adapted to bias the lever to the locked position.

10. A linear actuator as claimed in claim 9, wherein the lever is mounted on a rotatable spindle.

11. A linear actuator as claimed in claim 9, wherein the lever is located substantially within the housing.

12. A linear actuator as claimed in claim 9, wherein the biasing device comprises a plunger adapted to engage a portion of the lever and a resilient element adapted to apply a biasing force to the plunger.

13. A linear actuator as claimed in claim 9, wherein the housing includes a lever opening, a first portion of the lever is located within the housing, and a second portion of the lever is located outside the housing.

14. A linear actuator as claimed in claim 13, wherein the lever pivots about an axis located substantially outside the housing.

15. A linear actuator as claimed in claim 13, wherein the biasing device comprises a resilient element having a first portion attached to the housing and a second portion attached to the lever.

16. A linear actuator as claimed in claim 13, wherein the lever is mounted on a rotatable spindle.

17. A linear actuator as claimed in claim 13, wherein the lever is operably connected to an actuating cable.

18. A linear actuator as claimed in claim 9, wherein the gear nut end surface curvature is different than the bearing surface curvature.

19. A linear actuator as claimed in claim 9, wherein the gear nut end surface curvature is substantially spherical and the bearing surface curvature is substantially conical.

20. A linear actuator as claimed in claim 9, wherein the housing comprises a main section defining a threaded opening and threaded end cap adapted to engage the opening and apply a variable force to at least one of the first bearing surface, the second bearing surface, and the gear nut.

21. A linear actuator, comprising:
   a housing;
   a leadscrew traversing the housing;
   a gear nut, located substantially within the housing and around the leadscrew, rotating in response to axial movement of the leadscrew relative to the gear nut, and including a plurality of circumferentially-spaced castellations;
   first and second bearing surfaces respectively engaging the first and second longitudinal end surfaces of the gear nut; and
   a locking assembly including a pivotable lever adapted to move between a locked position wherein the lever engages one of the castellations and an unlocked position, a biasing device adapted to bias the lever to the locked position, a first actuator operably connected to the lever and adapted to move the lever to the unlocked position when at least a portion of the first actuator is moved in a first direction, and a second actuator operably connected to the lever and adapted to move the lever to the unlocked position when at least a portion of the second actuator is moved in a second direction, the second direction being different than the first direction.

22. A linear actuator as claimed in claim 21, wherein the first actuator comprises a cable and a conduit through which the cable extends.

23. A linear actuator as claimed in claim 22, wherein the conduit defines an end portion which substantially abuts the lever, a substantially fixed portion and a portion therebetween, and wherein the portion of the conduit between the end portion and the fixed portion is deformed when the lever is in the locked position.

24. A linear actuator as claimed in claim 23, wherein the cable defines an end portion that is prevented from moving in the first direction and a portion that extends from the end portion, through the lever and to a guide, and wherein at least some of the conduit between the end conduit portion and the fixed conduit portion is between the lever and the guide.

25. A linear actuator as claimed in claim 24, wherein the intermediate portion of the cable is deformed when the lever is in the locked position.

26. A linear actuator as claimed in claim 21, wherein the first and second longitudinal end portions of the gear nut define a gear nut end surface curvature, the bearing surfaces define a bearing surface curvature, and the gear nut is capable of pivoting to change the axis of rotation of the gear nut.

* * * * *